United States Patent
Springer et al.

(10) Patent No.: US 10,371,037 B2
(45) Date of Patent: Aug. 6, 2019

(54) INTERNAL COMBUSTION ENGINE WITH EXHAUST-GAS AFTERTREATMENT SYSTEM AND METHOD FOR OPERATING AN INTERNAL COMBUSTION ENGINE OF SAID TYPE

(71) Applicant: Ford Global Technologies, LLC, Dearborn, MI (US)

(72) Inventors: Moritz Klaus Springer, Hagen (DE); Thomas Lorenz, Köln (DE); Albert Breuer, Köln (DE); Jan Linsel, Cologne (DE); Jan Mehring, Köln (DE)

(73) Assignee: Ford Global Technologies, LLC, Dearborn, MI (US)

( * ) Notice: Subject to any disclaimer, the term of this patent is extended or adjusted under 35 U.S.C. 154(b) by 63 days.

(21) Appl. No.: 15/410,617

(22) Filed: Jan. 19, 2017

(65) Prior Publication Data
US 2017/0211456 A1 Jul. 27, 2017

(30) Foreign Application Priority Data
Jan. 27, 2016 (DE) ........................ 10 2016 201 184

(51) Int. Cl.
*F01N 13/10* (2010.01)
*F01N 3/20* (2006.01)

(52) U.S. Cl.
CPC ........... *F01N 13/10* (2013.01); *F01N 3/2013* (2013.01); *F01N 2240/16* (2013.01);
(Continued)

(58) Field of Classification Search
CPC .. F01N 13/10; F01N 2240/16; F01N 2260/14; F01N 3/2006; F01N 3/2013; F01N 2550/22; F01N 2610/107
(Continued)

(56) References Cited

U.S. PATENT DOCUMENTS 2,381,751 A * 8/1945 Hunt ..................... F02M 1/10
261/39.3
3,991,575 A * 11/1976 Bailey ................... F01K 27/005
60/669

(Continued)

FOREIGN PATENT DOCUMENTS

EP 0282085 A1 9/1988
EP 2525073 A1 11/2012
(Continued)

*Primary Examiner* — Thai Ba Trieu
*Assistant Examiner* — Diem T Tran
(74) *Attorney, Agent, or Firm* — Julia Voutyras; McCoy Russell LLP

(57) ABSTRACT

An exhaust system for an internal combustion engine is provided. The exhaust system includes an exhaust manifold receiving exhaust gas from a cylinder, an emission control device positioned downstream of the exhaust manifold, an electric heating device positioned in an exhaust line upstream of the emission control device and downstream of the exhaust manifold, the electric heating device including a frame at least partially surrounding a heating element, and an adjustment device configured to, during operation of the internal combustion engine, adjust the drag generated by the electric heating device in an exhaust gas flow through the exhaust line.

19 Claims, 5 Drawing Sheets

(52) U.S. Cl.
CPC ...... *F01N 2260/14* (2013.01); *F01N 2390/00* (2013.01); *F01N 2900/08* (2013.01); *F01N 2900/1404* (2013.01); *F01N 2900/1406* (2013.01); *Y02T 10/26* (2013.01)

(58) Field of Classification Search
USPC .......................................... 60/284, 299, 300
See application file for complete search history.

(56) References Cited

U.S. PATENT DOCUMENTS

| | | |
|---|---|---|
| 4,523,935 A | 6/1985 | Takagi et al. |
| 6,381,955 B1 * | 5/2002 | Morganti .............. F01N 3/2013 60/300 |
| 8,205,439 B2 | 6/2012 | Gonze et al. |
| 8,475,574 B2 | 7/2013 | Gonze et al. |
| 2009/0013686 A1 * | 1/2009 | Yaguchi .................. F02G 1/043 60/597 |
| 2009/0183501 A1 | 7/2009 | Gonze et al. |
| 2012/0003131 A1 | 1/2012 | Ibrahim et al. |

FOREIGN PATENT DOCUMENTS

| | | | |
|---|---|---|---|
| JP | S5351329 A | | 5/1978 |
| JP | H0331510 | * | 2/1991 |
| JP | H0331510 A | | 2/1991 |

* cited by examiner

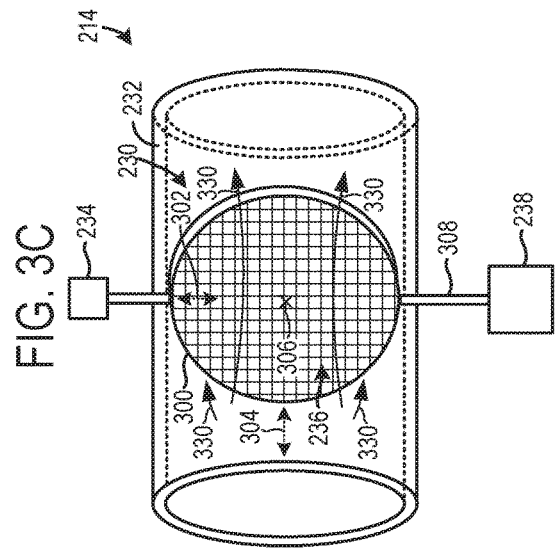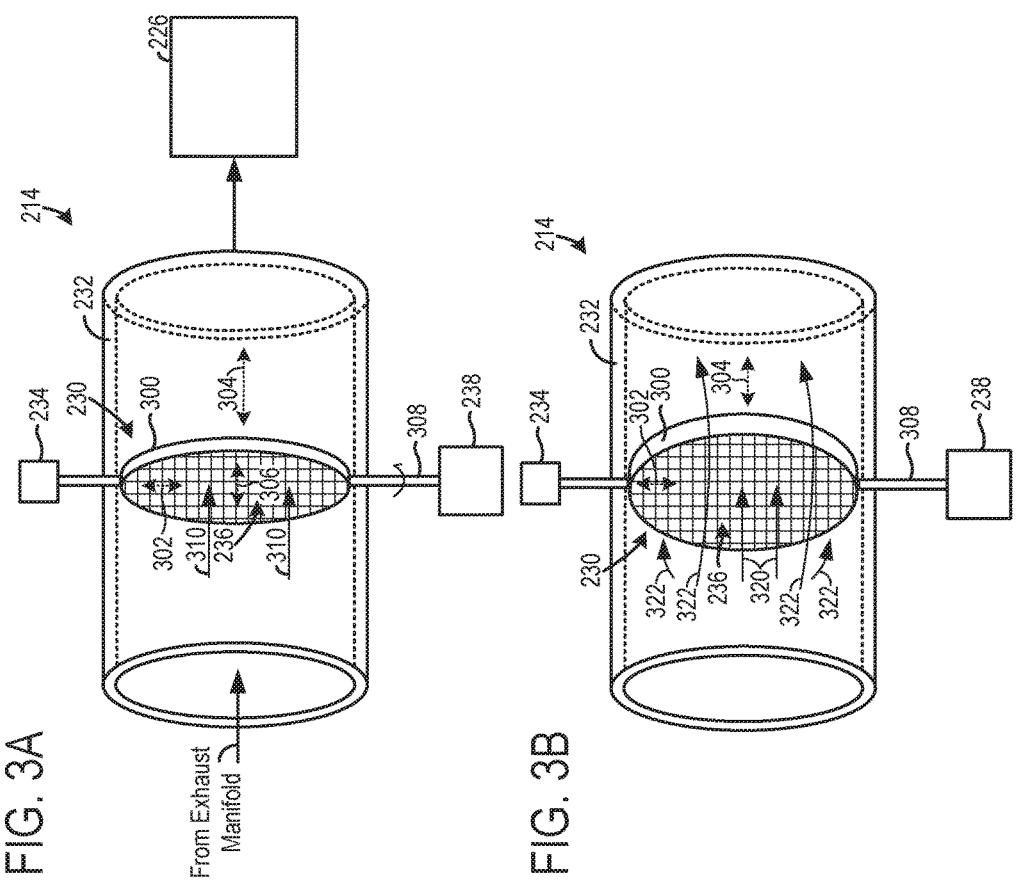

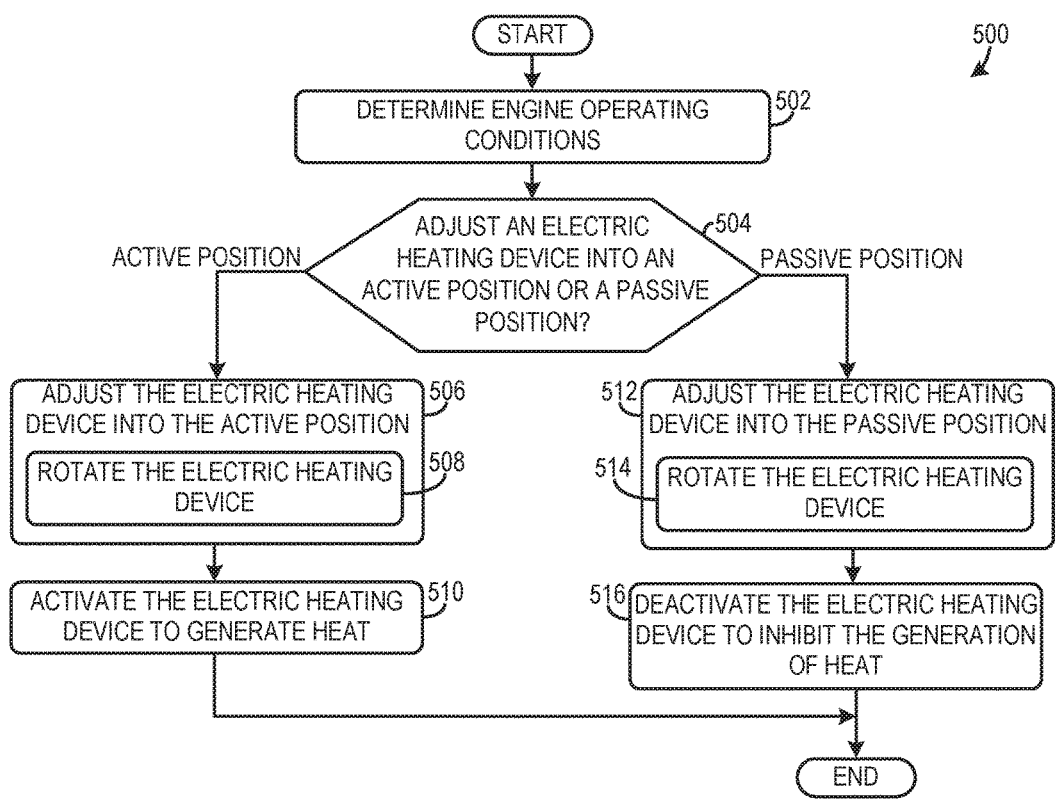

INTERNAL COMBUSTION ENGINE WITH EXHAUST-GAS AFTERTREATMENT SYSTEM AND METHOD FOR OPERATING AN INTERNAL COMBUSTION ENGINE OF SAID TYPE

CROSS REFERENCE TO RELATED APPLICATION

The present application claims priority to German Patent Application No. 102016201184.7, filed on Jan. 27, 2016. The entire contents of the above-referenced application are hereby incorporated by reference in its entirety for all purposes.

BACKGROUND/SUMMARY

Heating devices have been used in exhaust systems upstream of emission control devices to reduce emissions. For instance, a heater may be positioned upstream of a catalyst to enable adjustment in the temperature of the exhaust stream entering the catalyst. The increased exhaust gas temperature can increase conversion efficiency in the catalyst and decrease emissions. The amount of the heat generated by the heater may be adjusted to reduce emissions over a range of engine operating conditions. However, the heaters have fixed positions and can generate a large amount of back pressure during engine operation. Back pressure decreases engine efficiency and power output and increases engine fuel consumption.

In one approach, an exhaust system in an internal combustion engine is provided to overcome at least some of the drawbacks of previous exhaust systems. The exhaust system includes an exhaust manifold receiving exhaust gas from a cylinder, an emission control device positioned downstream of the exhaust manifold, an electric heating device positioned in an exhaust line upstream of the emission control device and downstream of the exhaust manifold, the electric heating device including a frame at least partially surrounding a heating element, and an adjustment device configured to, during operation of the internal combustion engine, adjust the drag generated by the electric heating device in an exhaust gas flow through the exhaust line. Adjusting the amount of flow resistance generated by the electric heating device enables the back pressure generated by the electric heating device to be reduced during selected time intervals, such as when heating of exhaust gas is not desired. Decreasing back pressure during these conditions can increase engine efficiency and power output and decrease engine fuel consumption.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 3A shows a first example of the electric heating device included in the exhaust system shown in FIG. 2 in an active position;

FIG. 3B shows the electric heating, shown in FIG. 3A, in a partially passive position;

FIG. 3C shows the electric heating device, shown in FIG. 3A, in a passive position;

FIG. 5 shows a method for operation of an internal combustion engine in a vehicle.

DETAILED DESCRIPTION

Figure 1C:
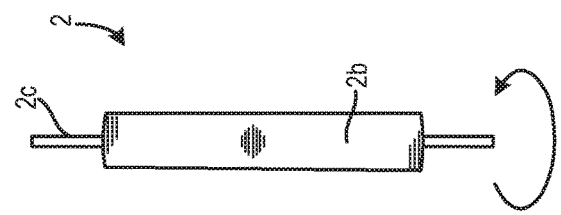
FIG. 1C shows the electric heating device illustrated in FIG. 1B, rotated into a passive position, in a view in the direction of the exhaust-gas flow.

An internal combustion engine which improves exhaust-gas aftertreatment when compared to previous systems, is described herein. In one example, this may be achieved by an internal combustion engine including an electric heating device which has at least one heating element arranged in the exhaust system (e.g., exhaust-gas discharge system) upstream of an exhaust-gas aftertreatment system, and the electric heating device can be transferred, by adjustment, from an active position (e.g., working position), in which the electric heating device at least partially blocks the exhaust system, into a passive position (e.g., rest position), in which the electric heating device blocks the exhaust system to a lesser extent, wherein the transfer may takes place independently.

The internal combustion engine described above may have at least one cylinder head and at least two cylinders, in which each cylinder has at least one outlet opening for the discharge of exhaust gases out of the cylinder through an exhaust system, each outlet opening being adjoined by an exhaust line, and at least one exhaust-gas aftertreatment system is arranged in the exhaust system.

A method for operating an internal combustion engine is also described herein. The internal combustion engine used to employ the method may be used as a motor vehicle drive unit. As described herein, the expression "internal combustion engine" encompasses diesel engines and Otto-cycle engines and also hybrid internal combustion engines, which utilize a hybrid combustion process, and hybrid drives which comprise not only the internal combustion engine but also an electric machine which can be connected in terms of drive to the internal combustion engine and which receives power from the internal combustion engine or which, as a switchable auxiliary drive, additionally outputs power.

In previous engines, to reduce the pollutant emissions, the engines can be equipped with various exhaust-gas aftertreatment systems. Even without additional measures, oxidation of the unburned hydrocarbons (HC) and of carbon monoxide (CO) duly takes place during the expansion and discharge of the cylinder charge at a high temperature level and in the presence of large oxygen quantities. However, on account of the exhaust-gas temperature which falls quickly in the downstream direction, and the consequently rapidly decreasing rate of reaction, said reactions may be quickly halted. A possible lack of oxygen may be compensated by blowing in secondary air. However, special reactors and/or filters may generally be provided in the exhaust system in order to noticeably reduce the pollutant emissions under all operating conditions.

Thermal reactors seek to realize a substantial post-oxidation of HC and CO in the exhaust system through the provision of thermal insulation and an adequately large volume in the exhaust system. The thermal insulation is intended to ensure a high temperature level through a reduction (e.g., minimization) of the heat losses, whereas a large volume ensures a long dwell time of the exhaust gases. Both the long dwell time and the high temperature level assist the desired post-oxidation. The poor efficiency with substoichiometric combustion and the high costs are disadvantageous. For diesel engines, thermal reactors are not effective on account of the temperature level being lower.

In previous Otto-cycle engines, use has been made of catalytic reactors which, through the use of catalytic materials which increase the rate of certain reactions, ensure an oxidation of HC and CO even at low temperatures. If nitrogen oxides ($NO_x$) are additionally to be reduced, this may be achieved through the use of a three-way catalytic converter, which however for this purpose may need stoichiometric operation ($\lambda \approx 1$) of the Otto engine to be maintained within narrow limits.

Here, the nitrogen oxides are reduced by the non-oxidized exhaust-gas components which are present, specifically the carbon monoxides and the unburned hydrocarbons, wherein said exhaust-gas components are oxidized at the same time. Despite catalytic assistance, oxidation catalytic converters and three-way catalytic converters may need a certain minimum temperature or light-off temperature in order to realize desirable (e.g., adequately high) conversion rates, which temperature may for example range from 120° C. to 250° C.

In internal combustion engines which are operated with an excess of air, that is to say for example spark-ignition engines operating in the lean-burn mode, but in particular direct-injection diesel engines or else direct-injection spark-ignition engines, the nitrogen oxides contained in the exhaust gas may not be able to be reduced in principle, that is to say owing to the lack of reducing agent.

For the oxidation of the unburned hydrocarbons and of carbon monoxide, an oxidation catalytic converter may be provided in the exhaust system. To reduce the nitrogen oxides, use is made of selective catalytic converters—so-called SCR catalytic converters—in which reducing agent is purposely introduced into the exhaust gas in order to selectively reduce the nitrogen oxides. As reducing agent, in addition to ammonia and urea, use may also be made of unburned hydrocarbons. The latter is also referred to as HC enrichment, with the unburned hydrocarbons being introduced directly into the exhaust system or else being fed in by way of engine-internal measures, for example by way of a post-injection of additional fuel into the combustion chamber after the actual combustion. Here, it may be desirable for the post-injected fuel to not be ignited in the combustion chamber by the main combustion that is still taking place or by the high combustion gas temperatures that exist even after the end of the main combustion, but rather it may be desirable to introduce the post-injection fuel into the exhaust system during the charge exchange.

Internal combustion engines which utilize post-injection are however highly susceptible to thinning or contamination of the oil with unburned hydrocarbons. Depending on the post-injected fuel quantity and the injection time, a greater or lesser fraction of the post-injected fuel impinges on the cylinder internal wall and mixes there with the adherent oil film. Subsequently, the fuel passes together with the oil and the blow-by gas into the crankcase, thus contributing significantly to the oil thinning. The oil thinning increases with rising fuel quantity and with a shift of the post-injection in a retarding direction. As a result, of the change of the lubricant characteristics of the oil, the oil thinning has a significant influence on wear and durability, that is to say on the service life of the internal combustion engine.

It is also possible to reduce the nitrogen oxide emissions by means of so-called nitrogen oxide storage catalytic converters. Here, the nitrogen oxides are initially, during lean-burn operation of the internal combustion engine, absorbed, that is to say collected and stored, in the catalytic converter in order to be reduced during a regeneration phase for example by means of substoichiometric operation ($\lambda < 1$) of the internal combustion engine with a deficit of oxygen, wherein the unburned hydrocarbons serve as reducing agent. Further engine-internal possibilities for the enrichment of the exhaust gas with reducing agent, in particular unburned hydrocarbons, are exhaust-gas recirculation (EGR) and, in the case of diesel engines, throttling in the intake system. As has already been stated further above with regard to SCR catalytic converters, an enrichment of the exhaust gas with unburned hydrocarbons may also be realized by using a post-injection of fuel, which is likewise to be regarded as an engine-internal measure. The disadvantages of said approach are those which have already been stated above, in particular the oil thinning, but also the use of additional fuel.

It is possible to dispense with engine-internal measures if the reducing agent is introduced directly into the exhaust system, for example by injection of additional fuel. During the regeneration phase, the nitrogen oxides are released and converted substantially into nitrogen dioxide ($N_2$), carbon dioxide ($CO_2$) and water ($H_2O$).

The frequency of the regeneration phases is determined by the overall emission of nitrogen oxides and the storage capacity of the storage catalytic converter. The temperature of the storage catalytic converter may lie in a temperature window between 200° C. and 450° C., such that firstly a fast reduction is ensured and secondly no desorption without conversion of the re-released nitrogen oxides takes place, such as may be triggered by excessively high temperatures.

One difficulty in the use of a storage catalytic converter arises from the sulfur contained in the exhaust gas, which sulfur is likewise absorbed in the storage catalytic converter and may be regularly removed by means of a desulfurization. For this purpose, the storage catalytic converter is heated to high temperatures, usually of between 600° C. and 700° C., and supplied with a reducing agent, which in turn can be attained by the transition to rich operation of the internal combustion engine.

With regard to the enrichment of the exhaust gas with reducing agent, reference is made to the statements already made further above.

In previous engines, to reduce the emission of soot particles, use is made of so-called regenerative particle filters which filter the soot particles out of the exhaust gas and store them, with said soot particles being burned off intermittently during the course of the regeneration of the filter. For this purpose, in order to oxidize the soot in the filter, oxygen or an excess of air in the exhaust gas is desirable, which can be achieved for example by way of superstoichiometric operation ($\lambda > 1$) of the internal combustion engine.

The high temperatures for the regeneration of the particle filter, of approximately 550° C. without catalytic assistance, are reached at high loads and high engine speeds during operation. It is therefore desirable to implement additional measures to ensure a regeneration of the filter under all operating conditions.

The heating of the particle filter can be realized by way of a post-injection of additional fuel into the combustion chamber, wherein the post-injected fuel is ignited already in the combustion chamber, which may occur as a result of ending main combustion or the high temperatures that prevail in the combustion chamber toward the end of the combustion, such that the exhaust-gas temperature of the exhaust gases discharged into the exhaust system is increased by engine-internal measures. To heat the exhaust gas and thus the filter, the internal combustion engine can also be operated substoichiometrically ($\lambda<1$), which can also be regarded as an engine-internal measure. Additional fuel may also be introduced directly into the exhaust system and ignited in order to increase the exhaust-gas temperature upstream of the filter.

In the context of the regeneration of the particle filter, too, it may be taken into consideration that the use of additional fuel for the purposes of warming the filter increases, out of principle, the fuel consumption of the internal combustion engine, be it as a result of a transition to rich engine operation or else as a result of the injection of fuel into the combustion chamber and/or into the exhaust system.

The various exhaust-gas aftertreatment devices, that is to say the catalytic converters, reactors and filters as described above, may have a significant and direct influence on the fuel quantity used for the exhaust-gas aftertreatment, and thus on the overall consumption of the internal combustion engine. In particular, for the operation and/or regeneration thereof, the exhaust-gas aftertreatment devices a certain temperature may be needed, which may necessitate the use of additional fuel.

The above statements show that exhaust-gas aftertreatment systems for the conversion of pollutants may have a certain desired operating temperatures, for which reason measures are implemented in order to generate and maintain the desired temperatures. Furthermore, it may be desirable to heat up the exhaust-gas aftertreatment systems rapidly to reach their operating temperature quickly, after a cold start, after a restart or during the warm-up phase, for instance.

Against the background of that stated above, it is an object of the present description to provide an internal combustion engine that is improved with regard to the exhaust-gas aftertreatment arrangement.

It is another objective of the present description to specify a method for operating an internal combustion engine that improves emission control. This objective may be achieved by an internal combustion engine having at least one cylinder head and having at least two cylinders, in which each cylinder may have at least one outlet opening for the discharge of exhaust gases out of the cylinder via an exhaust system, each outlet opening may be adjoined by an exhaust line, and at least one exhaust-gas aftertreatment system may be arranged in the exhaust system, and which internal combustion engine may be distinguished by the fact that an electric heating device which has at least one heating element is arranged in the exhaust system upstream of the at least one exhaust-gas aftertreatment system, and the electric heating device may be transferred, by adjustment, from an active position, in which the electric heating device at least partially blocks the exhaust system and thus constitutes a flow resistance for the exhaust gas in the exhaust system, into a passive position, in which the electric heating device blocks the exhaust system to a lesser extent and thus constitutes a reduced flow resistance for the exhaust gas in the exhaust system, wherein the transfer may take place independently.

In one example, an electric heating device may be arranged in the exhaust system upstream of the exhaust-gas aftertreatment system. In such an example, the electric heating device the exhaust gas may be warmed before it enters the at least one exhaust-gas aftertreatment system. The arrangement of the electric heating device in the vicinity of the exhaust-gas aftertreatment system may support the function of the electric heating device, specifically that of providing, that is to say supplying, warm or pre-warmed exhaust gas to the exhaust-gas aftertreatment system.

By way of an arrangement of the electric heating device close to the exhaust-gas aftertreatment system, the path of the warmed exhaust gas from the electric heating device to the exhaust-gas aftertreatment system may be shortened. The warmed exhaust gas may therefore be given only a small distance to cool down. The thermal inertia of the part of the exhaust system between the electric heating device and the exhaust-gas aftertreatment system may be reduced as a result of a reduction of the mass and the length of said part. As such in one example, the exhaust lines of at least two cylinders merge to form a merged exhaust line, thus forming an exhaust manifold, within the at least one cylinder head. The integration of the exhaust manifold into the cylinder head may further shorten the path of the exhaust system. Said measure may furthermore permit dense packaging of the drive unit and may reduce the number of components and therefore the assembly and procurement costs, if desired.

In another example, the exhaust lines may merge outside the at least one cylinder head, that is to say form at least one external exhaust manifold.

An electric heating device has the advantage that the electrical energy needed for the operation of the electric heating device may be energy recovered by regeneration. For example, energy recovered by way of a generator during overrun operation of the internal combustion engine of a motor vehicle may be used, together with an electric heating device, to heat the exhaust gas flowing through the exhaust gas-conducting lines of the exhaust system and to heat up, or supply warmed exhaust gas to, an exhaust-gas aftertreatment system arranged in the exhaust system.

In one example, the use of additional fuel for the heating of exhaust gas or of exhaust-gas aftertreatment systems arranged in the exhaust system may be reduced (e.g., eliminated), such that overall fuel consumption is reduced. Despite the active heating of the exhaust-gas aftertreatment system by an electric heating device, the fuel consumption of the internal combustion engine may not be increased, or may be increased to a lesser extent. Furthermore, the heating, or operation of the electric heating device, may be independent of the present operating state of the internal combustion engine, for example of whether the internal combustion engine is operated substoichiometrically or superstoichiometrically. Conversely, the operation of the electric heating device may not impose restrictions on the setting of the operating parameters of the internal combustion engine, in one example.

The internal combustion engine described herein may offer particular advantages after a cold start and in the warm-up phase when the exhaust-gas aftertreatment systems have not yet reached a desirable operating temperature and it is desired to shorten the heating-up process, but for example also during the desulfurization of a storage catalytic converter or the regeneration of a particle filter, when very high temperatures are desired.

Advantages may also be achieved in the case of partially deactivatable internal combustion engines, in which each cylinder group is provided with separate exhaust-gas aftertreatment systems, which perform aftertreatment on the exhaust gases from the associated cylinder group. This is because, in the event of partial deactivation, the exhaust-gas aftertreatment systems of the deactivated cylinder group are no longer flowed through by hot exhaust gas, and cool down. This effect may be further intensified if the valves of the deactivated cylinders are not also deactivated and the deactivated cylinders continue to participate in the charge exchange. It is then the case that cool air flows through the corresponding exhaust-gas aftertreatment systems, accelerating and intensifying the cooling process.

A similar situation may apply to internal combustion engines in which multiple exhaust-gas turbochargers are provided, the turbines of which are arranged in parallel in the exhaust system, and a turbine of one exhaust-gas turbocharger is in the form of a switchable turbine. Such internal combustion engines may have turbine-specific exhaust-gas aftertreatment systems, which may perform aftertreatment on the exhaust gases from the associated turbine. In the event of deactivation of the switchable turbine, the associated exhaust-gas aftertreatment systems may be likewise deactivated, that is to say are no longer flowed through by hot exhaust gas, and cool down.

In the internal combustion engine described herein the heating device may assume different positions, whereby, firstly, the warming-up effect can be controlled, that is to say regulated, in terms of its intensity, and secondly, the flow resistance of the heating device may be substantially reduced in the exhaust system.

The heating device may be transferred, by adjustment, from an active position, in which the heating device at least partially blocks the exhaust system and thus constitutes a flow resistance for the exhaust gas in the exhaust system, into a passive position, in which the heating device blocks the exhaust system to a lesser extent and thus constitutes a reduced flow resistance for the exhaust gas in the exhaust system.

The adjustment of the heating device into different positions may be realized in a wide variety of ways. In one specific example, the heating device itself, that is to say as a whole, may be adjusted, for example rotated. In another example, the heating elements may be adjusted but the heating device itself maintains its local positioning.

In one example, the heating device, situated in an active position, may at least partially block the exhaust system, whereby the exhaust-gas pressure upstream of the heating device is increased, and the pressure gradient across the heating device increases. The increased pressure gradient enables an increased flow speed of the exhaust gas as it flows through the heating device. The heat transfer is increased, and thus the temperature of the exhaust gas is increased.

In one example, in a passive position, the heating device may block the exhaust system to a lesser extent, and poses a reduced resistance to the exhaust gas, such that the pressure gradient across the heating device is smaller. The heat transfer is reduced, whereby the heating-up effect is lessened. Furthermore, the exhaust gas may at least partially flow around the heating device situated in the passive position.

The transfer from the passive position into the active position and from the active position into the passive position by way of an adjustment device may be performed passively, that is to say takes place automatically. For example, the electric heating device may be equipped with a self-controlling adjustment device. The adjustment of the heating device enables emissions to be reduced at selected time intervals while decreasing the back pressure generated by the device at other selected time intervals when heating of exhaust gas may not be desired.

The internal combustion engine may also have two cylinder heads, for example if a plurality of cylinders are distributed on two cylinder banks.

In one example, the internal combustion engine may include at least one exhaust-gas aftertreatment system having an oxidation catalytic converter.

In another example, the internal combustion engine may include at least one exhaust-gas aftertreatment system having a storage catalytic converter.

In another example, the internal combustion engine may include at least one exhaust-gas aftertreatment system having a particle filter.

In another example, the internal combustion engine may include at least one exhaust-gas aftertreatment system having a selective catalytic converter.

The explanations given above with regard to the various exhaust-gas aftertreatment systems and the operation thereof may also apply to any of the exhaust-gas aftertreatment systems described herein. It is desirable to intermittently heat exhaust-gas aftertreatment system actively with the aid of auxiliary devices. It will be appreciated that the exhaust-gas aftertreatment system described herein may include one or more emission control devices such as catalysts, filters, etc. For instance, each of the above-mentioned exhaust-gas aftertreatment devices may also be used, that is to say designed, as a component of a combined exhaust-gas aftertreatment system. Consequently, it may also be possible for multiple emission control devices of different types to be used in a single exhaust-gas aftertreatment system, in some examples.

Therefore, in one example the internal combustion engine may also include an exhaust-gas aftertreatment system having a four-way catalytic converter.

A four-way catalytic converter may be an example of a combined exhaust-gas aftertreatment system and may include, for example, an oxidation catalytic converter, a storage catalytic converter and a particle filter.

In another example, the internal combustion engine may include, for the purposes of exhaust-gas aftertreatment, an oxidation catalytic converter, a storage catalytic converter and a particle filter provided so as to be connected in series, the storage catalytic converter may be arranged upstream of the particle filter, and the oxidation catalytic converter may be arranged upstream of the storage catalytic converter.

In another example, the exhaust-gas aftertreatment system may be designed with regard to the temperature desired for the reduction of the respective pollutants.

By virtue of the fact that the oxidation catalytic converter may be provided upstream of the two other emission control devices, the oxidation catalytic converter may be the exhaust-gas aftertreatment system which is arranged near (e.g., closest) to the outlet of the internal combustion engine, and through which the hot exhaust gases flow first. Consequently, the heat losses, and the associated reduction in temperature of the hot exhaust gases, are lower. Accordingly, the oxidation catalytic converter may reach its so-called light-off temperature of for example 150° C. within a relatively short period of time even after a cold start. In particular during substoichiometric operation of the internal combustion engine, the high concentration of unburned hydrocarbons in the exhaust gas ensures a noticeable increase in exhaust-gas temperature owing to the intensified oxidation processes in the oxidation catalytic converter. In this case, the heat may be released where it is needed, specifically in the vicinity of the exhaust-gas aftertreatment system.

The exothermic reactions taking place in the oxidation catalytic converter may effect heating of the exhaust gas flowing through, and thus heating of the downstream exhaust-gas aftertreatment system, specifically the storage catalytic converter and the particle filter. The reactions taking place in the storage catalytic converter are associated with a release of a small amount of heat, and in this way lead to an increase of the exhaust-gas temperature and of the temperature of the particle filter.

In another example, the internal combustion engine may include a battery which provides the electrical energy for the at least one electric heating device when desired.

In another example, the internal combustion engine may include a cylinder having at least two outlet openings.

The valve drive may function to open and close the inlet and outlet openings of the cylinders at selected time intervals. In one example, the valve drive may be designed to enable fast opening with a large flow cross sections in order to keep the throttling losses in the inflowing and outflowing gas flows low and in order to provide charging of the cylinder with fresh mixture, and an effective (e.g., substantially complete) discharge of the exhaust gases. It therefore may be advantageous for the cylinders to be provided with two or more outlet openings.

Further advantageous features of the internal combustion engine will be discussed below. In another example, the internal combustion engine may be configured such that the exhaust lines of at least two cylinders merge to form a merged exhaust line, the at least one exhaust-gas aftertreatment system is arranged in the merged exhaust line, and the electric heating device is arranged in the merged exhaust line.

In one example, the exhaust lines from only a portion of the cylinders may merge to form a merged exhaust line. However, in other example the exhaust lines from all of the cylinders in a cylinder head may merge to form a merged exhaust line.

In another example, the internal combustion engine may include an electric heating device having a frame in which the at least one heating element is arranged or clamped. In such an example, the heating elements together with the frame may form an integral prefabricated assembly, whereby among other things the assembly process is simplified.

In another example, the internal combustion engine may include multiple heating elements arranged in the frame. If multiple heating elements are provided, at least two heating elements are provided.

In another example, the internal combustion engine may include multiple heating elements arranged in a grid in the frame.

In examples where the electric heating device has a frame, the frame may have a shape that corresponds to the cross section of that section of the exhaust system in which the electric heating device is arranged. For instance, exhaust line may have a circular or oval cross section and the frame of the heating device may also have a circular or oval periphery. It will be appreciated that size (e.g., diameter) of the frame may be slightly smaller than the size of the cross-section of the exhaust line to enable movement of the heating device from an active position to a passive position, in some examples.

In such an example, the heating device may be transferred into an active position in which the exhaust gas flows through the device and is impeded from flowing around the edges of the frame.

In some examples, the frame of the electric heating device may have an annular shape.

Further in some examples, the electric heating device may include at least one heating element with a wire. In such an example, the heating element with a wire may have the shape of a spiral or heating coil or may also form weave or mesh. The heating element may also include one or more wires having a rectilinear shape. In such an example, the wire(s) may form a grid pattern (e.g., a pattern where the overlapping wires form a series of squares or rectangles). In other examples, the wires in the electric heating element may be arranged parallel to one another.

In other examples, the electric heating device may include one or more heating elements with a band-like shape (e.g., have the shape of a flat or thin strip). When the heating elements have a band-like shape the heat-transferring surface area can be increased when compared to wire shaped heating elements. In this way, a greater amount of heat may be transferred from the electric heating device to the exhaust gas passing therethrough. When the electric heating device includes a plurality of heating elements having a band shape the heating elements may be radially aligned with regard to a round (e.g., circular or oval) frame of the electric heating device, in some examples. However, in other examples the electric heating device may include a plurality of heating elements with a band shape arranged parallel to one another. Band shaped heating elements may face by way of the narrow side of the cross section towards the exhaust-gas flow, to reduce flow impingement (e.g., back pressure generation) of the electric heating device. For instance, a flat surface on the band shape heating element may be parallel to a central axis of the exhaust line in which the heating element is arranged. A band-like form of the heating element together with the specific orientation of the heating element may improve flow with regard to the heat transfer.

In other examples, the electric heating device may include a heating element with wires or bands in a vane-like form. That is to say, that the wires or bands may be radially aligned with regard to a central axis of the frame. In such an example, the heating elements may act as a guide device for the warmed exhaust-gas flow.

In another example, a guide device may be provided in the electric heating device. The guide device may be configured to guide and divert exhaust in a desirable manner. In such an example, the guide device may be adjustable, the adjustment of the guide device or of the heating elements can also be utilized for transferring the heating device into the various positions.

In one example, the electric heating device may have at least two heating elements. With the number of heating elements, the heat-transferring surface area increases, and with the surface area, the heat transfer by convection increases. In this example, the at least two heating elements may be arranged spaced apart from one another.

Further in one example, the at least one heating element of the electric heating device may be adjustable by way of an adjustment device. This enables the heating device to assume different positions. In such an example, the heating elements can be adjusted. Said adjustment of the heating elements can be utilized for transferring the heating device into different positions. The heating device itself may maintain its local positioning and orientation, or may itself also be adjustable. In one example, the electric heating device can be transferred from the active position into the passive position by rotation about an axis of rotation. In the passive position, the heating device may be oriented in the flow direction, that is to say along the streamlines of the exhaust-gas flow, in order to pose a decreased (e.g., minimized) flow resistance for the exhaust gas that is flowed through the exhaust system. The exhaust-gas flow then impinges on the narrow side of the heating device. This may yield advantages from a flow aspect.

By contrast, in the active position, when the heating device may be oriented transversely (e.g., perpendicularly) with respect to the exhaust-gas flow and which at least partially blocks the exhaust gas flowing through the exhaust gas discharge system.

A method for operating an internal combustion engine is also described herein. The method is distinguished by the fact that the electric heating device may be activated for the purposes of warming the exhaust gas.

That which has been stated above regarding the internal combustion engine may also apply to the method described herein, for which reason reference is made to the corresponding statements.

In the method the electric heating device may be activated for the purposes of warming the exhaust gas when the fuel supply to the internal combustion engine is deactivated.

If the fuel supply is deactivated, the heat released during the combustion as a result of the exothermic chemical conversion of the fuel, or the exhaust gas, which serves to warm the exhaust-gas aftertreatment system to a desired operating temperature is reduced (e.g., eliminated).

In one example, the heating device may be activated so as to heat the exhaust gas when the fuel supply of the internal combustion engine is deactivated.

In the method, the electric heating device may be activated for the purposes of warming the exhaust gas during an overrun condition.

In the method the heating device may be activated so as to heat the exhaust gas when the fuel supply of the internal combustion engine is deactivated for a predefinable time period $\Delta t_1$.

The introduction of an additional condition for the activation of the heating device may reduce unwanted (e.g., excessive) activation and deactivation of the heating device, in particular an activation of the heating device if the fuel supply is deactivated only briefly, without the need for heating of the exhaust gas by means of the heating device.

In the method the electric heating device may be activated for the purposes of warming the exhaust gas in the warm-up phase of the internal combustion engine.

In the method the electric heating device may be transferred from a passive position into an active position in order to force the warming of the exhaust gas.

For the operation of a hybrid vehicle which includes not only the internal combustion engine but also an electric machine as a drive, examples of the method are advantageous in which, proceeding from a situation in which drive is provided by way of the electric machine, the electric heating device is activated, for the purposes of warming the exhaust gas, before the ignition of the internal combustion engine is initiated, or the internal combustion engine is started, for drive purposes.

Figure 1B:
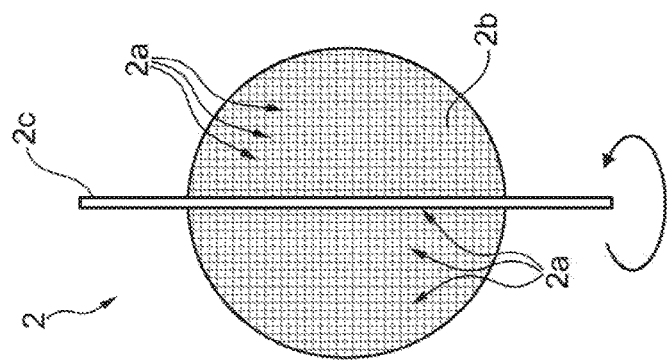
FIG. 1B shows the electric heating device illustrated in FIG. 1A in a view in the direction of the exhaust-gas flow.
Figure 1A:
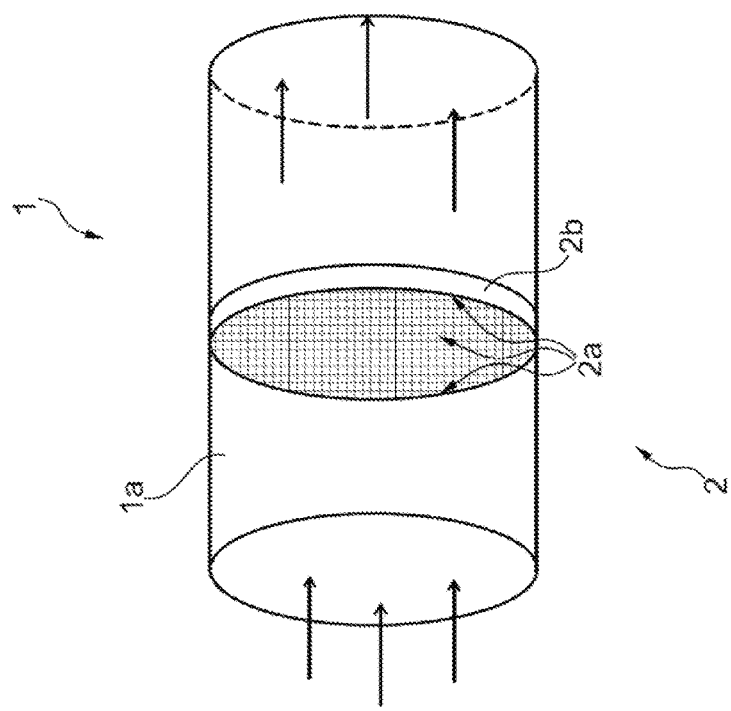
FIG. 1A shows, in a semi-perspective illustration, an example electric heating device of in an internal combustion engine in an active position.

FIG. 1A shows, in a semi-perspective illustration, the heating device 2 of a first embodiment of the internal combustion engine in an active position.

The internal combustion engine has an exhaust system 1 for the discharge of the exhaust gases from the cylinders. In the exhaust system 1 there is arranged at least one exhaust-gas aftertreatment system for the aftertreatment of the exhaust gases and reduction of the pollutant emissions (not illustrated).

An electric heating device 2 is arranged, upstream of the at least one exhaust-gas aftertreatment system, in a merged exhaust line 1a of the exhaust system 1, which electric heating device serves for warming the exhaust gas and/or devices in the exhaust-gas aftertreatment system.

The heating device 2 has a frame 2b in which multiple wire-like heating elements 2a may be arranged (e.g., clamped) in the manner of a grid. The frame 2b may have a circular shape and thus a cross section which corresponds to the exhaust system 1, such that the heating device 2, when situated in the active position, blocks (e.g., completely blocks) the merged exhaust line 1a, and a decreased amount of exhaust gas can flow past the heating device 2. Here, the heating device 2 is oriented transversely, in the present case perpendicularly, with respect to the exhaust-gas flow.

FIG. 1B shows the heating device 2 illustrated in FIG. 1A in a view in the direction of the exhaust-gas flow. The longitudinal axis of the merged exhaust line 1A is perpendicular to the plane of the drawing. The illustration also shows the axis of rotation 2c about which the heating device 2 together with the heating elements 2A, that is to say as a whole, can be rotated. The electric heating device 2 can be transferred from the active position into a passive position by rotation about the axis of rotation 2c.

FIG. 1C shows the heating device 2 illustrated in FIG. 1B, rotated through 90° into a passive position, in a view in the direction of the exhaust-gas flow.

In the passive position shown, the heating device 2 may be oriented in the flow direction, that is to say along the streamlines of the exhaust-gas flow. The heating device 2, when situated in the passive position, poses a low flow resistance to the exhaust-gas flow. The heating device 2 faces by way of the narrow side of the frame 2b toward the exhaust-gas flow.

Figure 2:
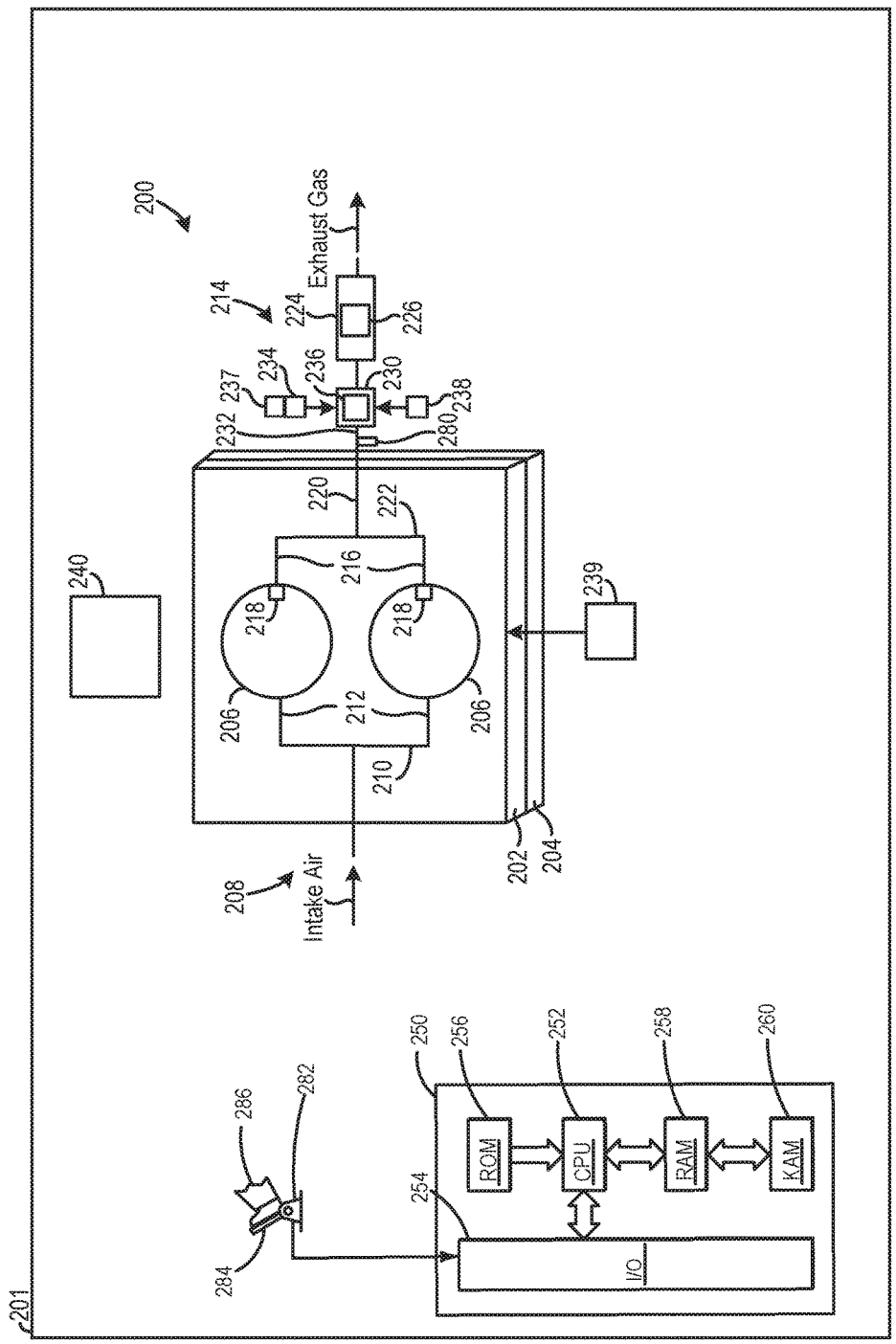
FIG. 2 shows a schematic depiction of an internal combustion engine including an exhaust system with an electric heating device.

FIG. 2 shows a schematic depiction of an internal combustion engine 200 in a vehicle 201. The internal combustion engine 200 is described as including the electric heating device 230 depicted in FIGS. 3A-3C. However, it will be appreciated that the electric heating device 2 and associated components, features, etc., shown in FIGS. 1A-1C, may be included in the internal combustion engine 200, shown in FIG. 2, in other examples.

The internal combustion engine 200 includes a cylinder head 202 coupled to a cylinder block 204 forming two cylinders 206. However, engines with an alternate number of cylinders have been contemplated. The internal combustion engine 200 also includes an intake system 208 configured to provide intake air to the cylinders 206 through intake manifold 210, intake lines 212, and/or other components such as a throttle, air intake, etc. The internal combustion engine 200 also includes an exhaust system 214 configured to receive exhaust gas from the cylinders 206. The exhaust system 214 includes two exhaust lines 216 coupled to (e.g., directly coupled to) the cylinders 206 via outlet openings 218. The two exhaust lines 216 merge to form a merged exhaust line 220. An exhaust manifold 222 may be provided at the confluence of the two exhaust lines 216 and the merged exhaust line 220. However in other examples, the exhaust manifold may receive exhaust gas from a single conduit coupled to a cylinder.

The internal combustion engine 200 also includes an exhaust-gas aftertreatment system 224 arranged in the exhaust system 214. The exhaust-gas aftertreatment system 224 includes at least one emission control device 226 (e.g., catalyst, filter, etc.).

The exhaust system 214 also includes an electric heating device 230 positioned upstream of the emission control device 226 and downstream of the exhaust manifold 222 in an exhaust line 232. In one example, the electric heating device 230 may be position directly upstream of the emission control device 226 with no intervening components positioned therebetween. The electric heating device 230 is configured to adjust the temperature of the exhaust gas flowing through the exhaust line 232. An activation device 234 may be provided in the exhaust system 214 to control the amount of heat generated by a heating element 236 in the electric heating device 230. For instance, the activation device 234 may be configured to alter the amount of current provided to the heating element 236. An adjustment device 238 configured to adjust the position of the electric heating device 230 is also included in the exhaust system 214 to alter the amount of drag generated by the electric heating device 230 in the exhaust line during engine operation. An energy storage device 237 (e.g., battery) may be coupled to the activation device 234 and therefore the electric heating device 230. As such, the energy storage device 237 may be configured to provide electrical energy to the activation device 234 and electric heating device 230.

The internal combustion engine 200 also includes a fuel system 239 configured to supply fuel to the cylinders 206 at selected time intervals. The fuel system 239 may include one or more fuel pumps, fuel injectors (e.g., direct or port injectors), fuel lines, fuel tanks, etc.

The vehicle 201 also includes an electric machine 240 (e.g., electric motor) configured to provide motive power to the vehicle during selected time intervals. In this way, the vehicle 201 may have a hybrid configuration. Numerous, hybrid vehicle arrangements have been contemplated such as arrangements where the electric motor and the engine are operated in series, parallel, etc.

Controller 250 is shown in FIG. 2 as a microcomputer, including microprocessor unit 252, input/output ports 254, an electronic storage medium for executable programs and calibration values shown as read only memory chip 256 in this particular example, random access memory 258, keep alive memory 260, and a data bus. Controller 250 may receive various signals from sensors coupled to internal combustion engine 200. For example, the controller 250 may receive measurement of exhaust gas temperature from temperature sensor 280 and pedal position (PP) from a pedal position sensor 282 coupled to a pedal 284 actuated by an operator 286. Engine speed signal, RPM, may be generated by controller 250 from signal PIP. The controller 250 may be configured to send command signals to the adjustment device 238 and the activation device 234. Moreover, the controller 250 along with corresponding control system components may be configured to perform the method steps described herein.

FIGS. 3A-3C shows a detailed view of a portion of the exhaust system 214 shown in FIG. 2 including the exhaust line 232 and the electric heating device 230 in different positions. The adjustment device 238 and the activation device 234 are also depicted in FIGS. 3A-3C. Although the adjustment device 238 and the activation device 234 are depicted as separate structures, it will be appreciated that in other example the adjustment device and activation device may be integrated into a single enclosure. As previously discussed, both the adjustment device 238 and the activation device 234 may receive control signals from the controller 250, shown in FIG. 2. However in other examples, the controller and corresponding command logic may be built into the adjustment device and/or activation device.

The activation device 234 may be configured to activate and deactivate the heating element 236 in the electric heating device 230 to adjust the amount of exhaust gas heating provided by the electric heating device 230.

Furthermore, the adjustment device 238 is configured to rotate a frame 300 of the electric heating device 230 coupled to a rotational shaft 308 to adjust the position of the heating device. The frame 300 rotates about an axis of rotation 302. Additionally in the depicted example, the axis of rotation 302 is perpendicular to a central axis 304 of the exhaust line 232. It will be appreciated that other relative positions between the frame 300 and the exhaust line 232 have been contemplated. Moreover, other types of mechanical adjustment of the electric heating device 230 have been contemplated. For instance, the adjustment device 238 may be configured to extend and retract the frame into and out of the exhaust line or rotate individual heating element bands, in other examples.

FIG. 3A shows the electric heating device 230 in an active position that generates an increased amount of drag when compared to the positions shown in FIGS. 3B and 3C. In the position shown in FIG. 3A a central axis 306 of the frame 300 is parallel to the central axis 304 of the exhaust line 232. However, other frame arrangements have been contemplated. The contour of the frame 300 corresponds to the cross-section of the exhaust line 232 in which it is positioned. Specifically in the depicted example, the frame is in the shape of a ring which corresponds to the circular cross-section of the exhaust line. Moreover, in the active position the gap between the frame and the wall of the exhaust line may be sized (e.g., sufficiently small) to enable a majority of the exhaust gas in the exhaust line to flow through the heating element 236. Arrows 310 depict the general direction of exhaust gas flow through the heating element 236. Therefore, in the active position the heating element 236 may be activated to increase the temperature of the exhaust gas flowing through the heating element 236, when desired. Consequently, operation of the heating element may be coordinated with the adjustment device 238 to increase the amount of exhaust gas heating, in some examples. In this way, the temperature of the downstream emission control device 226 can be increased, if desired.

FIG. 3B shows the electric heating device 230 in a position which generates less drag than the active position shown in FIG. 3A. In particular in FIG. 3B, the frame 300 of the electric heating device 230 is rotated by 45° from the position shown in FIG. 3A. However, the electric heating device may be adjusted into numerous rotational orientations. The position of the heating device shown in FIG. 3B may be referred to as a passive position or a partially passive position. Arrows 320 depict the general direction of exhaust gas flow through the heating element 236 and arrows 322 depict the general direction of exhaust gas flow around the frame 300 and the heating element 236 of the electric heating device 230. It will be appreciated that more exhaust gas may be flowed around the frame 300 and the heating element 236 than through the heating element 236, in the position shown in FIG. 3B, when compared to the position of the frame shown in FIG. 3A. Consequently, the electric heating device 230 generates less drag in the position shown in FIG. 3B. As a result, the back pressure generated by the electric heating device 230 is decreased. In one example, when the electric heating device 230 is in the position shown in FIG. 3B, the activation device 234 may deactivate the heating element 236 to reduce the temperature of the exhaust gas flowing through the exhaust line 232. However, in other examples, the activation device may activate the heating element 236 when the electric heating device 230 is in the position shown in FIG. 3B.

FIG. 3C shows the electric heating device 230 in a position that generates even less drag than the positions of the heating device shown in FIG. 3A or 3B. In particular in FIG. 3C, the frame 300 of the electric heating device 230 is rotated by 45° from the position shown in FIG. 3B. Additionally, in FIG. 3C the central axis 306 of the frame 300 is perpendicular to the central axis 304 of the exhaust line 232. However, other frame and exhaust line arrangements may be used in other examples. The position of the heating device shown in FIG. 3C may be referred to as a passive position. It will be appreciated that the active and passive positions may be more generally referred to as a first and second position. Arrows 330 depict the general direction of exhaust gas flow around the frame 300 and the heating element 236 of the electric heating device 230. It will be appreciated that the position of the electric heating device 230 shown in FIG. 3C generates even less drag than the positions of heating device shown in FIG. 3A and FIG. 3B. Consequently, back pressure generation by the electric heating device 230 can be further reduced. Again, the heating element 236 may be deactivated by the activation device 234 when the electric heating device 230 is in the position shown in FIG. 3C.

Figure 4A:
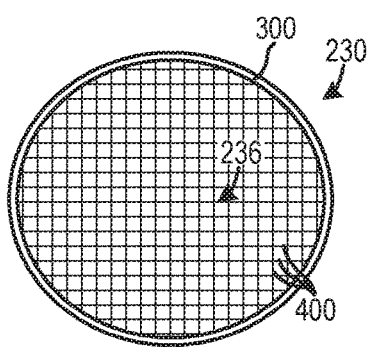
FIG. 4A shows a detailed view of the electric heating device, shown in FIG. 3A.

FIG. 4A shows a detailed view of the electric heating device 230 shown in FIG. 3A. The frame 300 and heating element 236 of the electric heating device 230 is shown. In the depicted example, the heating element 236 includes a plurality of wires 400 arranged in a grid pattern. In the grid pattern illustrated in FIG. 4A the plurality of wires 400 extend across the frame and perpendicularly intersect with one another. However, other wire pattern arrangements have been contemplated. It will be appreciated that electrical energy may be provided to the wires 400 at desired time interval by the activation device 234, shown in FIG. 2, to enable the wires to generate heat, thereby increasing the temperature of the exhaust gas flowing therethough.

Figure 4B:
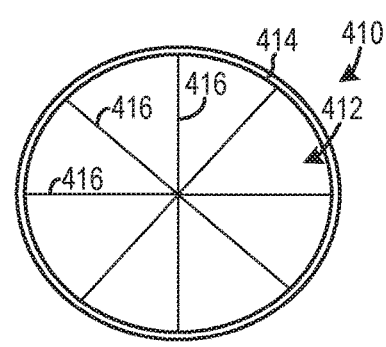
FIG. 4B shows another example of an electric heating device that may be included in the exhaust system, shown in FIG. 2 and FIGS. 3A-3C.

FIG. 4B shows another exemplary electric heating device 410 that may be included in the exhaust system 214 shown in FIG. 2 and FIGS. 3A-3C. In FIG. 4B the heating element 412 enclosed in the frame 414 include a plurality of radially aligned bands 416. Again, electrical energy may be provided to the bands 416 at selected time intervals by the activation device 234, shown in FIG. 2, to generate heat.

Figure 4C:
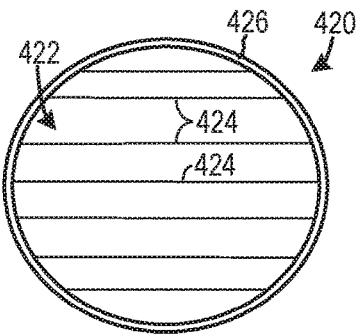
FIG. 4C shows another example of an electric heating device that may be included in the exhaust system, shown in FIG. 2 and FIGS. 3A-3C.

FIG. 4C shows yet another exemplary electric heating device 420 that may be included in the exhaust system 214 shown in FIG. 2 and FIGS. 3A-3C. The electric heating device 420 shown in FIG. 4C includes a heating element 422 having a plurality of bands 424 laterally extending across a frame 426. Again, electrical energy may be provided to the bands 424 at selected time intervals by the activation device 234, shown in FIG. 2, to generate heat.

FIG. 5 shows a method 500 for operating an internal combustion in a vehicle. It will be appreciated that the method 500 may be implemented by the internal combustion engine and exhaust system described above with regard to FIGS. 1A-4C or may be implemented by other suitable internal combustion engines and exhaust systems.

At 502 the method includes determining engine operating conditions. The operating conditions may include engine temperature, engine speed, exhaust temperature, emission control device temperature, etc.

Next at 504 the method includes determining if an electric heating device should be adjusted into an active position or a passive position, the electric heating device arranged in an exhaust line upstream of an emission control device. This determination may be based on the engine operating conditions. For instance, it may be determined that the electric heating device should be in an active position when the engine is below a threshold temperature and/or speed or an emission control device is below a threshold temperature, for instance. Conversely, it may be determined that the electric heating device should be in a passive position when the engine is above a threshold temperature and/or speed or an emission control device is above a threshold temperature. Furthermore, in the active position the electric heating device may generate more drag in the exhaust gas flow in the exhaust line in which the heating device is positioned when compared to the drag generated by the electric heating device in the passive position.

If it is determined that be electric heating device should be adjusted into an active position the method advances to 506. At 506 the method includes adjusting the electric heating device into the active position. Adjusting the electric heating device into the active position may include step 508, rotating the electric heating device. As previously discussed, when the electric heating device is in the active position an increased amount of drag may be generated by the heating device. However, when the electric heating device is in the active position an increased amount of exhaust gas may also be directed through the heating element in the heating device. Therefore, at step 510 the method includes activating the electric heating device to generate heat and increase the temperature of the exhaust gas flowing through the electric heating device while the electric heating device is in the active position. In this way, the electric heating device may be activated at selected time intervals, such as when heating of a downstream emission control device is desired. In one example, the electric heating device may be activated when fuel supplied to the internal combustion engine is deactivated. In another example, the electric heating device may be activated during an overrun condition where the engine speed is above a threshold value. In yet another example, the electric heating device may be activated during a warm-up phase of the internal combustion engine when the engine is below a threshold temperature.

However, if it is determined that the electric heating device should be in the passive position the method advances to step 512. At 512 the method includes adjusting the electric heating device into the passive position which may include rotating the electric heating device at 514. In the passive position the electric heating device generates less drag when compared to the active position. In this way, the position of the electric heating device may be adjusted to change an amount of drag generated by the electric heating device in an exhaust gas flow through an exhaust line in which the electric heating device is positioned.

However, in the passive position less exhaust gas is also flowed through the heating element. As such, heat generated by the electric heating device may not be desired when the electric heating device is in the passive position. Therefore, at 516 the method includes deactivating the electric heating device to inhibit the generation of heat by the heating element. In this way, the electric heating device may be activated and deactivated at selected time intervals.

It will be appreciated that in other examples, the activation of the heating element in the electric heating device and the adjustment of the heating may take place independently. For instance, the heating element may be activated in both the passive and active positions to adjust the temperature of the exhaust gas. In another example, the electric heating device may be adjusted into the active and passive positions when the heating element is deactivated. In such an example, the movement of the electric heating device alters the flowrate of exhaust gas provided to a downstream emission control device.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Further, one or more of the various system configurations may be used in combination with one or more of the described diagnostic routines. The subject matter of the present disclosure includes all novel and non-obvious combinations and sub-combinations of the various systems and configurations, and other features, functions, and/or properties disclosed herein.

The invention claimed is:

1. An exhaust system in an internal combustion engine comprising:
    an exhaust manifold receiving exhaust gas from a cylinder;
    an emission control device positioned downstream of the exhaust manifold;
    an electric heating device positioned in an exhaust line, the exhaust line positioned upstream of the emission control device and downstream of the exhaust manifold, the electric heating device including a frame at least partially surrounding a heating element; and
    an adjustment device including a rotational shaft coupled to the electric heating device and extending through opposing sides of the frame, wherein during operation of the internal combustion engine, the adjustment device rotates the rotational shaft about an axis of the rotational shaft longitudinally extending through the rotational shaft to adjust drag generated by the electric heating device in an exhaust gas flow through the exhaust line.

2. The exhaust system of claim 1, wherein the rotational shaft rotates about an axis of rotation perpendicular to a central axis of the exhaust line.

3. The exhaust system of claim 1, wherein the adjustment device adjusts the rotational shaft to place the electric heating device into a first position and a second position during operation of the internal combustion engine, in the first position the electric heating device generates a greater amount of drag in the exhaust gas flow when compared to the drag generated by the electric heating device in the second position.

4. The exhaust system of claim 3, further comprising an activation device in electronic communication with the heating element activating the heating element to generate heat when the electric heating device is in the first position and deactivates the heating element to inhibit the generation of heat by the heating element when the electric heating device is in the second position.

5. An internal combustion engine comprising:
    two cylinders, wherein each cylinder has an outlet opening for discharge of exhaust gases out of each cylinder through an exhaust system, and wherein each outlet opening is adjoined by an exhaust line;
    an exhaust-gas aftertreatment system arranged in the exhaust system;
    an electric heating device having a heating element arranged in the exhaust system upstream of the exhaust-gas aftertreatment system; and
    an adjustment device coupled to a rotational shaft extending through opposing sides of a frame, wherein the adjustment device adjusts the electric heating device from an active position where the electric heating device at least partially blocks the exhaust system to generate a flow resistance for the exhaust gas in the exhaust system, into a passive position where the electric heating device blocks the exhaust system to a lesser extent to reduce the flow resistance for the exhaust gas in the exhaust system, wherein the adjustment takes place independently, and wherein the rotational shaft rotates about an axis longitudinally extending through the rotational shaft during adjustment of the electric heating device.

6. The internal combustion engine of claim 5, wherein the electric heating device can be adjusted from the active position into the passive position by rotating the electric heating device about the axis of rotation.

7. The internal combustion engine of claim 5, wherein the exhaust lines of the two cylinders merge to form a merged exhaust line and the electric heating device is arranged in the merged exhaust line.

8. The internal combustion engine of claim 5, wherein the electric heating device has the frame in which the heating element is arranged.

9. The internal combustion engine of claim 8, wherein the heating element includes a plurality of heating wires arranged in a grid pattern in the frame.

10. The internal combustion engine of claim 8, wherein the frame has a shape that corresponds to a cross section of a merged exhaust line in which the electric heating device is arranged.

11. The internal combustion engine of claim 5, wherein the heating element includes a plurality of heating wires.

12. The internal combustion engine of claim 5, wherein the heating element includes a plurality of heating bands.

13. The internal combustion engine of claim 12, wherein the plurality of heating bands is radially aligned.

14. A method for operating an internal combustion engine in a vehicle comprising:
    rotating an electric heating device about a rotational axis of a rotational shaft extending through opposing sides of a frame of the electric heating device to adjust a position of the electric heating device to change an amount of drag generated by the electric heating device in an exhaust gas flow through an exhaust line in which the electric heating device is positioned, and wherein the rotational shaft rotates about an axis longitudinally extending through the rotational shaft; and
    activating the electric heating device to increase a temperature of the exhaust gas passing through the exhaust line at selected time intervals.

15. The method of claim 14, wherein the electric heating device is activated when fuel supplied to the internal combustion engine is deactivated, and wherein the electric heating device is rotated responsive to an operating condition which is greater under a first condition and lesser under a second condition, wherein the operating condition includes one or more of engine overrun and engine temperature relative to a threshold temperature.

16. The method of claim 14, wherein the electric heating device is activated during an overrun condition.

17. The method of claim 14, wherein the electric heating device is activated during a warm-up phase of the internal combustion engine.

18. The method of claim 14, wherein rotating the electric heating device includes rotating the electric heating device into a passive position and an active position, wherein in the passive position the electric heating device generates less drag when compared to the active position, and wherein the electric heating device is activated while the electric heating device is in the active position.

19. The method of claim 14, wherein the electric heating device is activated after an electric machine provides motive power to the vehicle and before an ignition event of the internal combustion engine.

* * * * *